Figure 1:
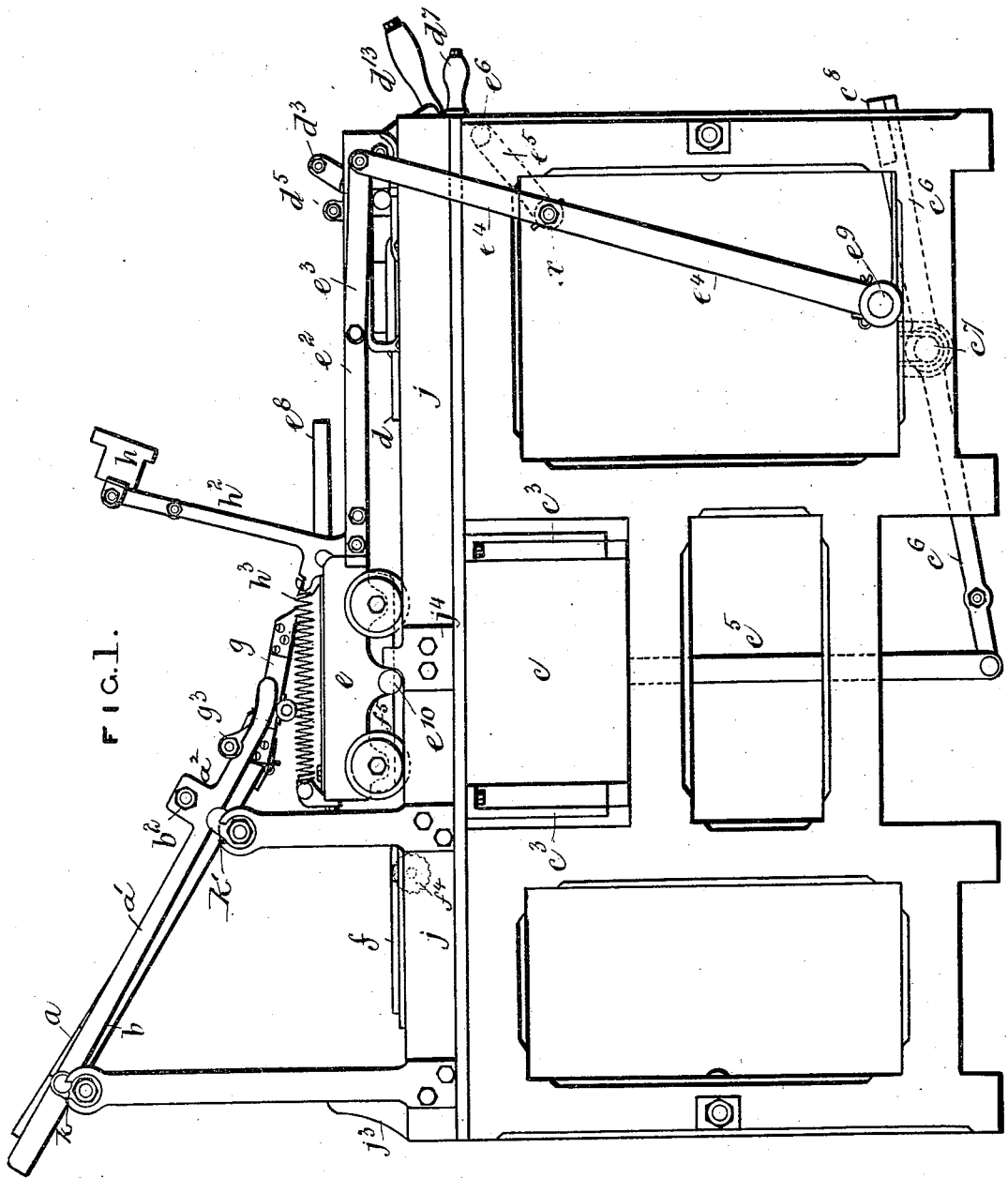

(No Model.) 11 Sheets—Sheet 1.

J. TICKLE & F. LEONARDT.
MACHINE FOR LABELING PACKETS.

No. 346,832. Patented Aug. 3, 1886.

Witnesses,
George Shaw
Richard Skerrett

Inventors
John Tickle
Frederick Leonardt (No Model.) 11 Sheets—Sheet 2.

J. TICKLE & F. LEONARDT.
MACHINE FOR LABELING PACKETS.

No. 346,832. Patented Aug. 3, 1886.

Witnesses,
George Shaw
Richard Skerrett

Inventors
John Tickle
Frederick Leonardt (No Model.) 11 Sheets—Sheet 3.

J. TICKLE & F. LEONARDT.
MACHINE FOR LABELING PACKETS.

No. 346,832. Patented Aug. 3, 1886.

Witnesses,
George Shaw
Richard Skerrett

Inventors
John Tickle
Frederick Leonardt

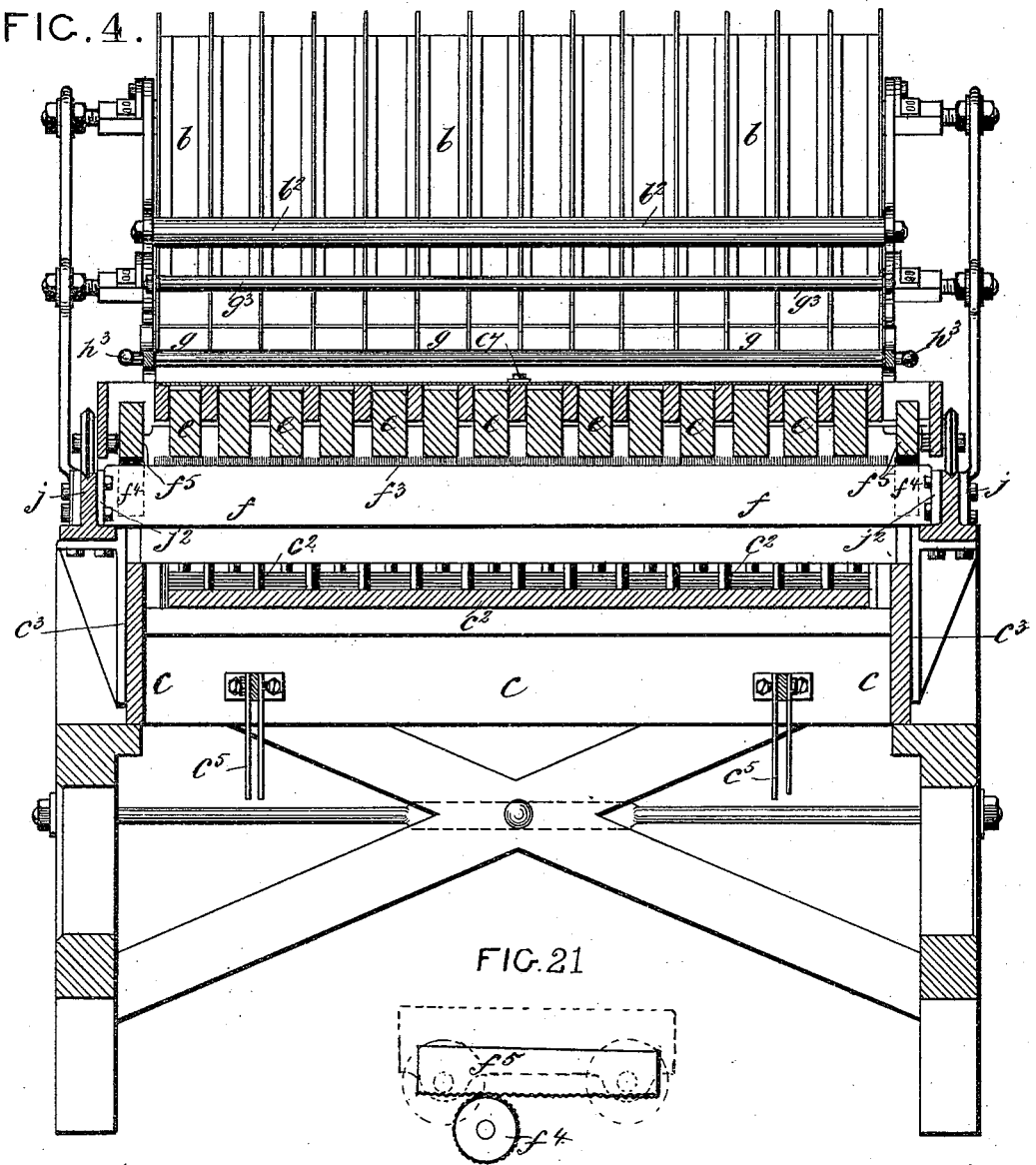

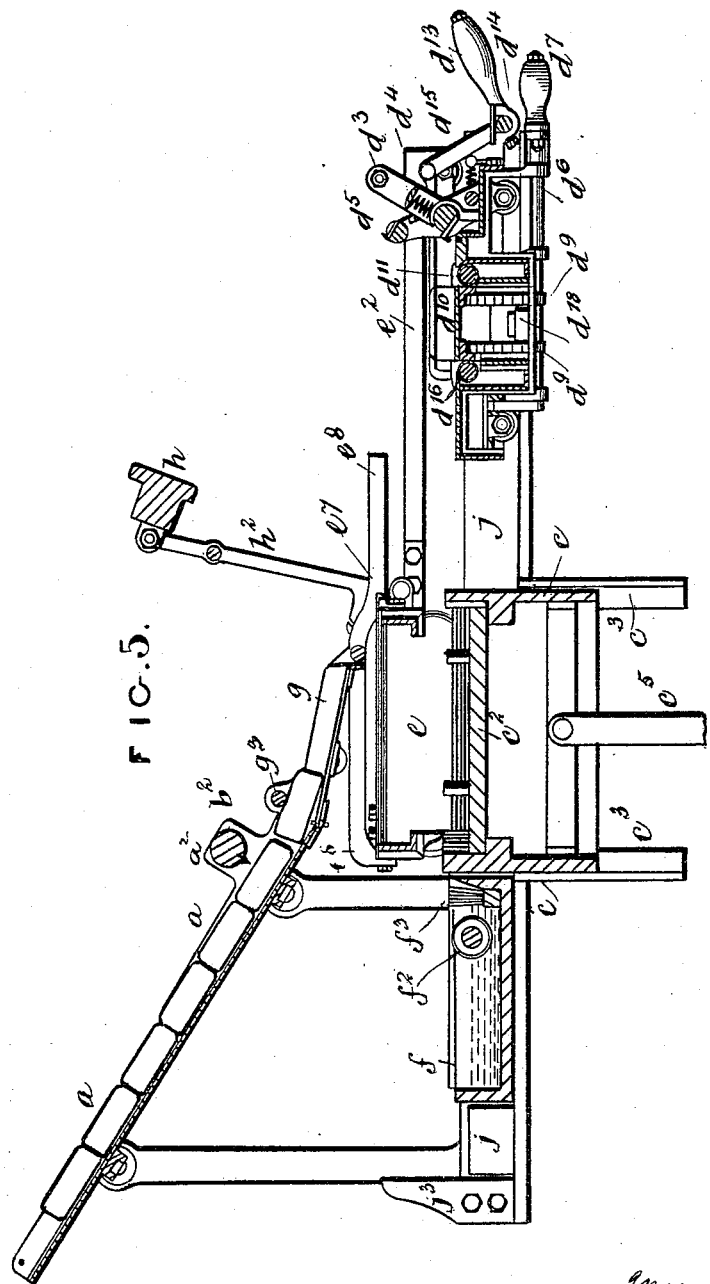

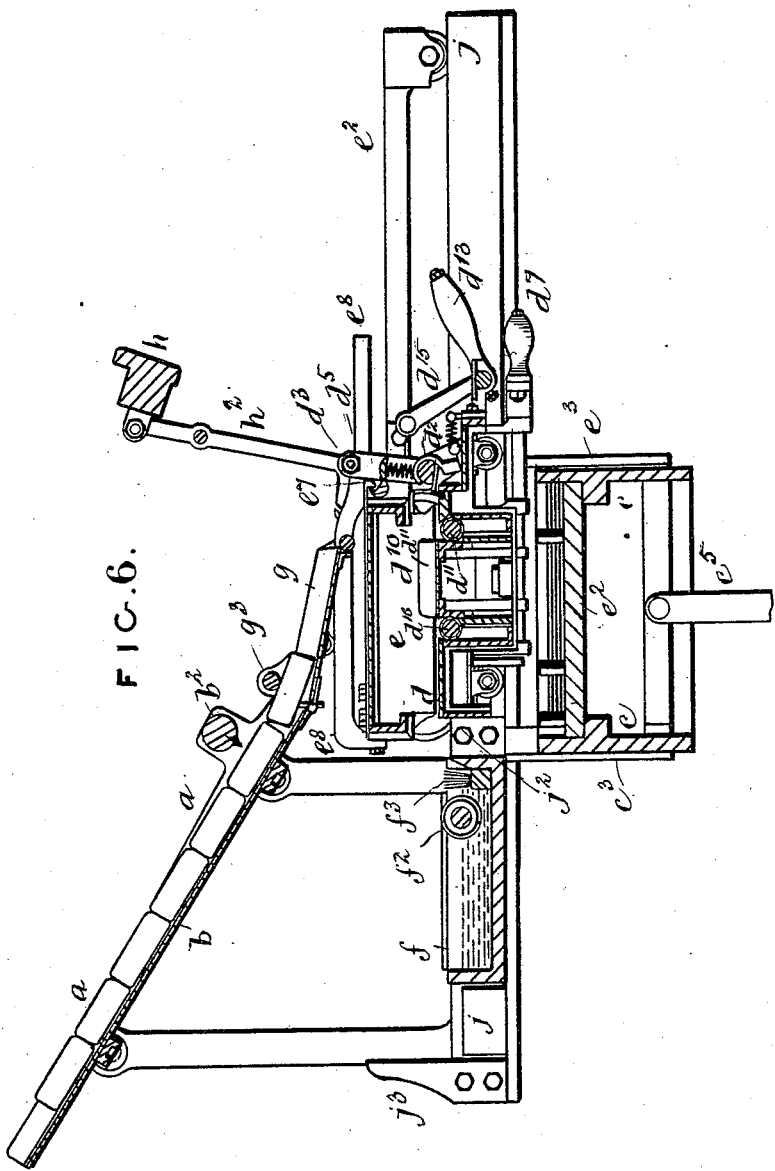

(No Model.)  11 Sheets—Sheet 7.
J. TICKLE & F. LEONARDT.
MACHINE FOR LABELING PACKETS.
No. 346,832.  Patented Aug. 3, 1886.
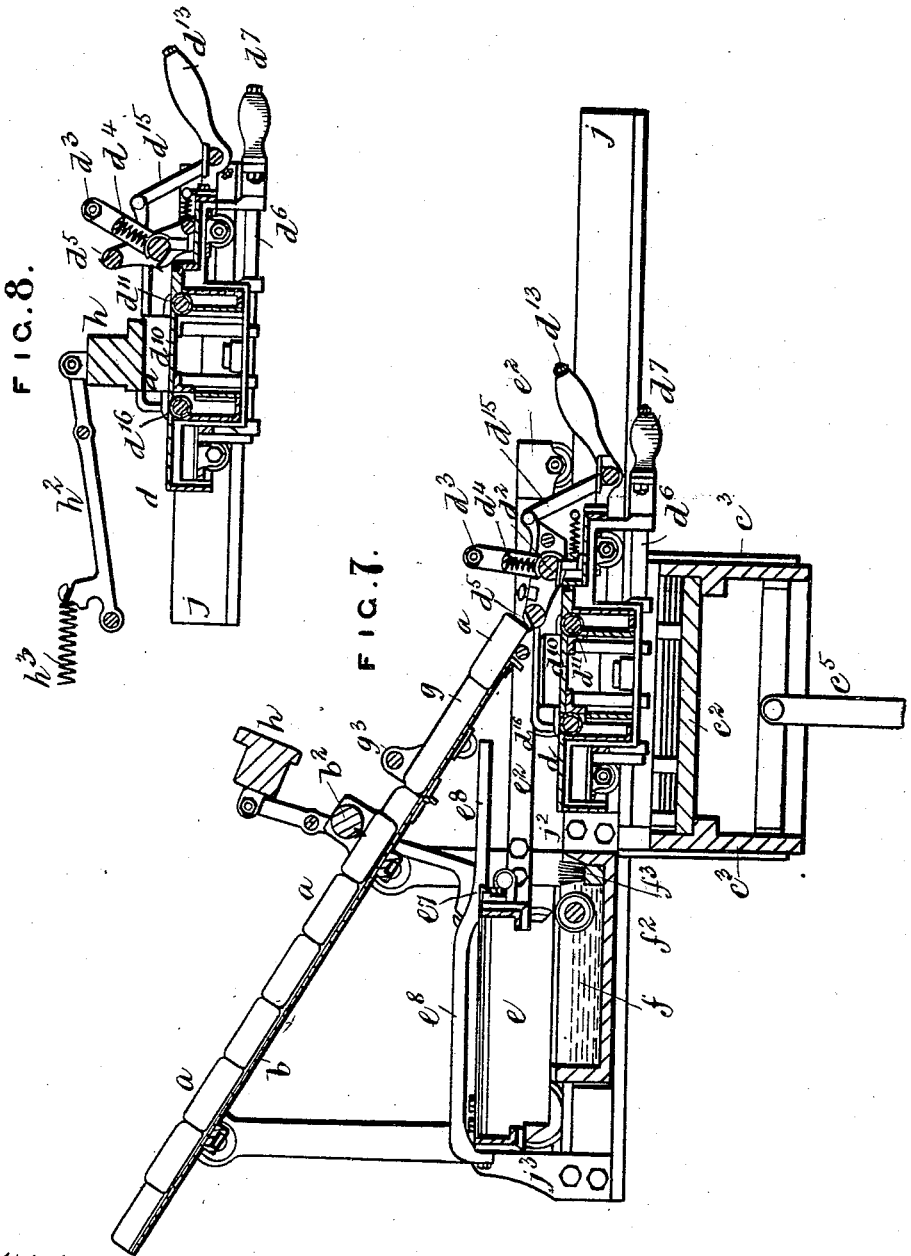

(No Model.) 11 Sheets—Sheet 8.

J. TICKLE & F. LEONARDT.
MACHINE FOR LABELING PACKETS.

No. 346,832. Patented Aug. 3, 1886.

Witnesses,
George Shaw
Richard Skerrett

Inventors
John Tickle
Frederick Leonardt (No Model.) 11 Sheets—Sheet 9.
J. TICKLE & F. LEONARDT.
MACHINE FOR LABELING PACKETS.
No. 346,832. Patented Aug. 3, 1886.
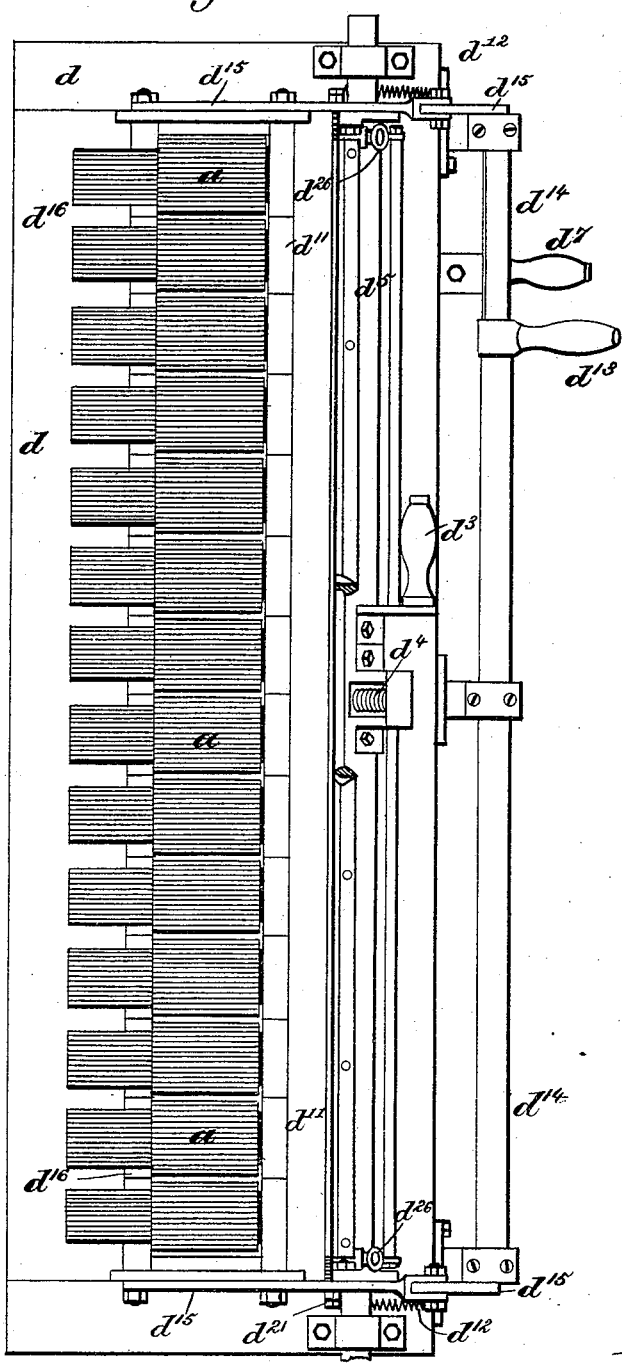
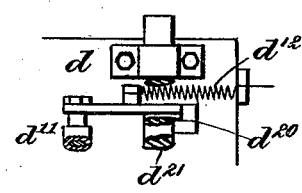
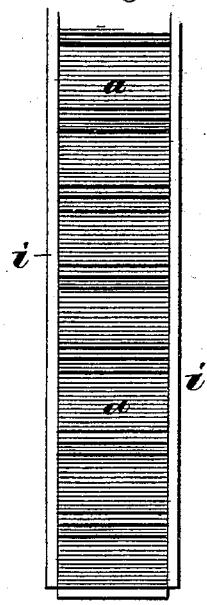
Witnesses.
George Shaw
Richard Skerrett
Inventors.
John Tickle
Frederick Leonardt (No Model.) 11 Sheets—Sheet 10.
J. TICKLE & F. LEONARDT.
MACHINE FOR LABELING PACKETS.
No. 346,832. Patented Aug. 3, 1886.
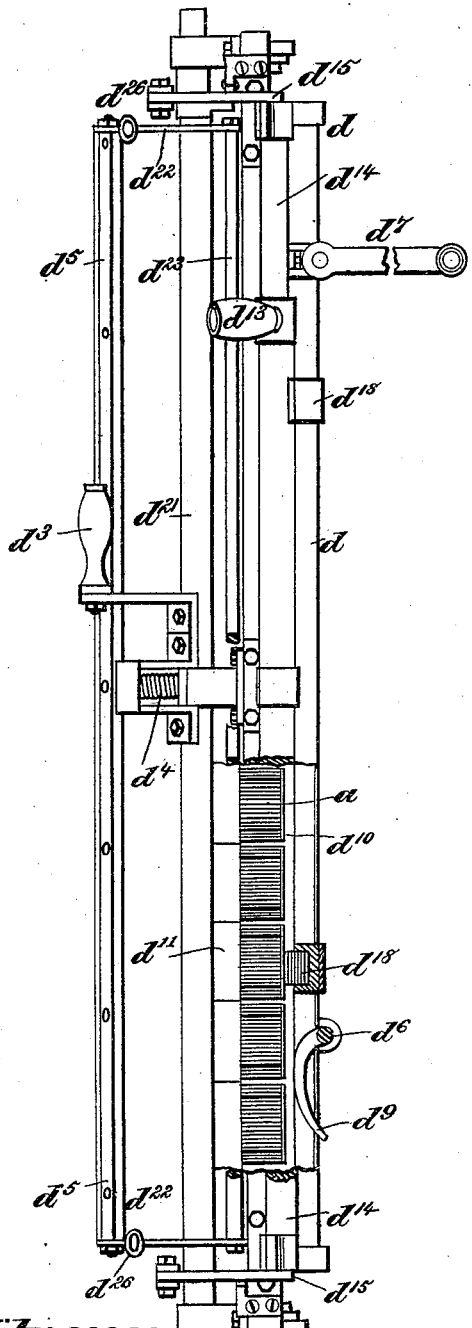
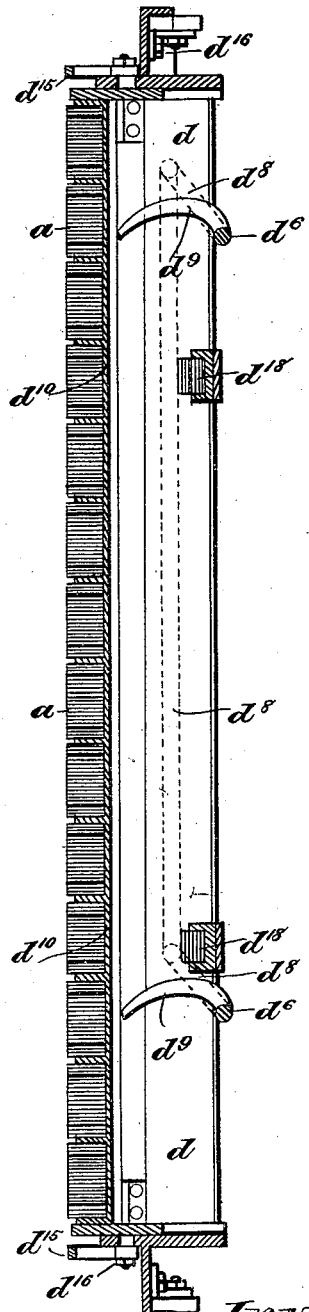

(No Model.) 11 Sheets—Sheet 11.
J. TICKLE & F. LEONARDT.
MACHINE FOR LABELING PACKETS.
No. 346,832. Patented Aug. 3, 1886.
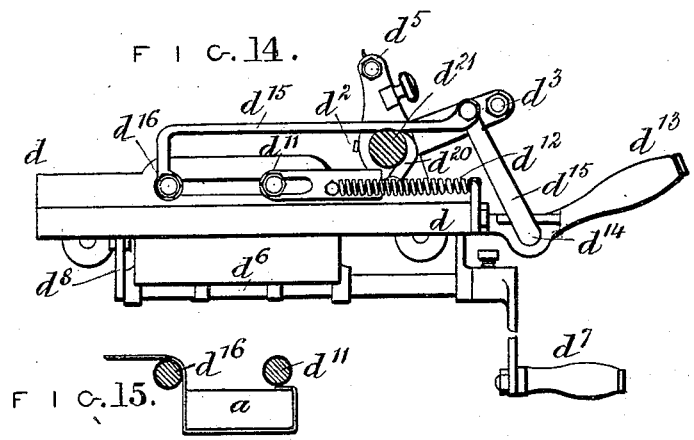
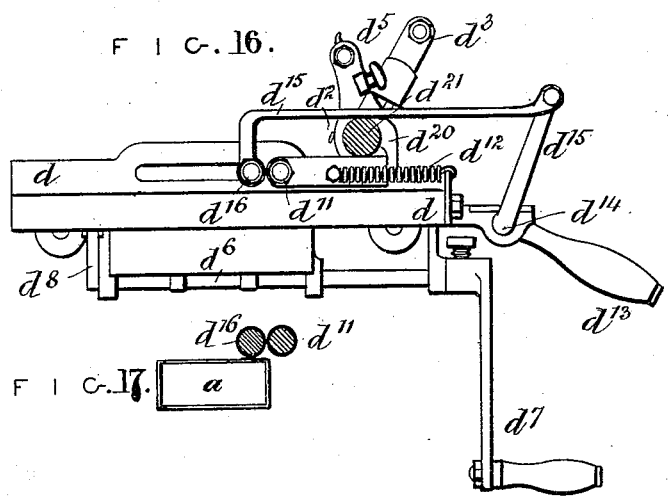

UNITED STATES PATENT OFFICE.

JOHN TICKLE, OF WEST BROMWICH, AND FREDERICK LEONARDT, OF HANDS-WORTH, COUNTY OF STAFFORD, ENGLAND, ASSIGNORS TO EDWARD CADDICK, OF WEST BROMWICH, WILLIAM CREED, OF STROUD, AND ARNOLD THOMAS, OF NEWNHAM, ENGLAND, TRUSTEES.

MACHINE FOR LABELING PACKETS.

SPECIFICATION forming part of Letters Patent No. 346,832, dated August 3, 1886.

Application filed February 17, 1885. Serial No. 156,193. (No model.) Patented in England May 15, 1884, No. 7,744; in France January 22, 1885, No. 166,593; in Belgium January 26, 1885, No. 67,655, and in Germany February 20, 1885, No. 33,411.

*To all whom it may concern:*

Be it known that we, JOHN TICKLE, of West Bromwich, in the county of Stafford, England, mechanical engineer and iron-founder, and FREDERICK LEONARDT, of Handsworth, in the county of Stafford, England, merchant, subjects of the Queen of Great Britain, have invented new or Improved Machinery for Labeling Packets and Boxes of Powdered Materials, and other Commodities for Sale, (for which we have made application for Letters Patent in Great Britain on the 15th day of May, 1884, No. 7,744; in France on the 22d day of January, 1885, No. 166,593; in Belgium on the 26th day of January, 1885, No. 67,655ᴮ, and in Germany on the 20th February, 1885, No. 33,411,) of which the following is a specification.

Our invention consists of hand-worked machinery for labeling at one operation a series of packets and boxes of powdered materials and other commodities for sale, the parts of the said machinery being constructed, arranged, and operated in the manner herein described, and illustrated in the accompanying drawings.

Figure 2:
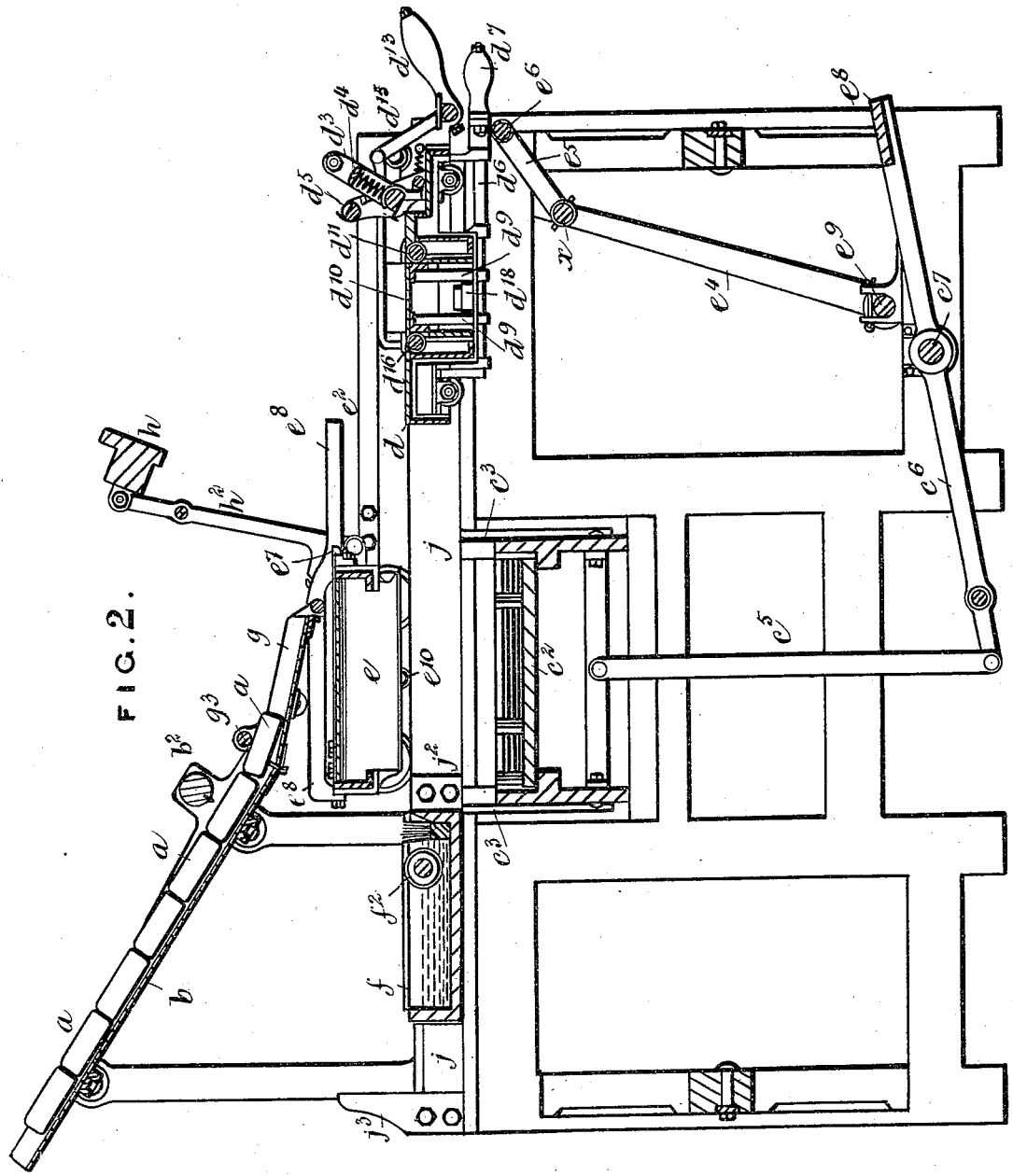
Figure 3:
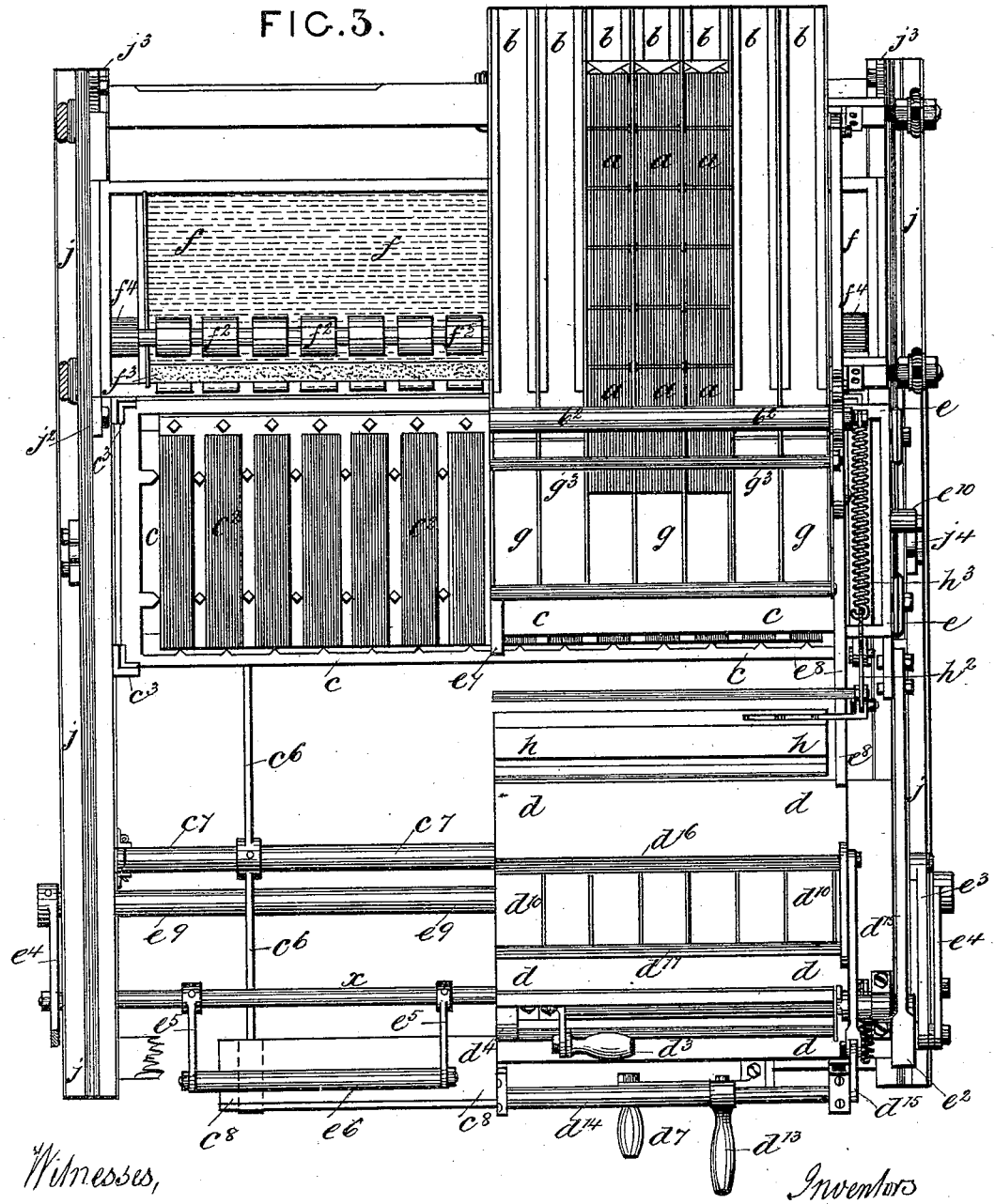
Figure 9:
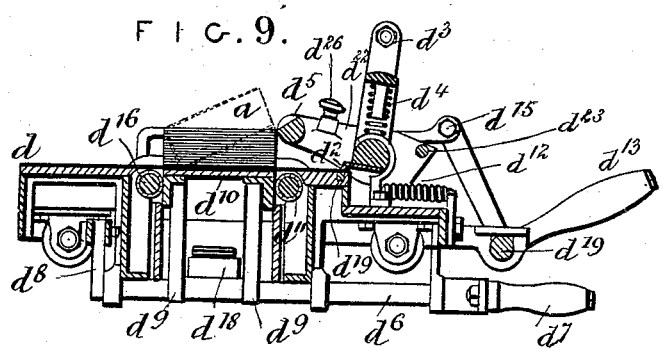
Figure 10:
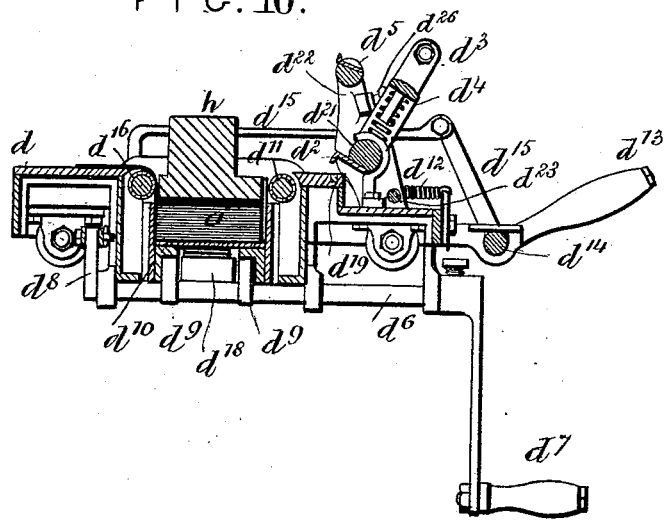

Figure 1 represents the machine in side elevation, and Fig. 2 the same in longitudinal vertical section, the labeling-table and pasters and other parts being represented in their first positions. Fig. 3 represents the machine in plan, the right-hand half showing the channels or inclined sluices, the divisional receiver, and the labeling-table, and the left-hand half showing the paste-trough, the label-tray in the rising frame, and the lever mechanism, all the parts being in their first positions. Fig. 4 represents the machine partly in end elevation and partly in transverse vertical section, taken through the pasters and label-tray, the several parts being represented in their first positions. Figs. 5, 6, and 7 represent longitudinal sections of the machine without the framing and lever mechanism, Fig. 5 representing the rising frame supporting the label-tray raised into position and the top labels in contact with the taking-off blocks or pasters, Fig. 6 representing the rising frame in its first or lowered position with the label-ing-table moved forward underneath the taking-off blocks or pasters, and the lever-grip locked down upon the short unpasted ends of the labels, and Fig. 7 representing the taking-off blocks or pasters moved back over the paste-trough, the packets released from the divisional receiver and resting against the leveling-bar of the labeling-table. Fig. 8 represents the labeling-table detached and brought into its back or first position, the packets being in position upon the pasted labels and the press-bar in position upon the packets. Figs. 9 to 18 represent the labeling-table detached from the machine, drawn to a larger scale than the other figures. Fig. 9 represents the labeling-table in longitudinal section, with the packets left in position against the leveling-bar from the divisional receiver. Fig. 10 represents the same view with the rising and falling divisional platform in its lowest position, the packets being pressed between the back and front rollers for the labeling operation and the press-bar in its lowest position upon the packets. Fig. 11 represents a plan of the device represented in Fig. 10. Fig. 12 represents a portion of what is represented in Fig. 11. Fig. 13 represents the labeling-table, partly in longitudinal vertical section and partly in front elevation. Fig. 14 represents an elevation of the labeling-table, and Fig. 15 a portion of the same in cross-section, the front roller being in position over the packets and the short ends of the labels pasted on the packets. Fig. 16 represents the same view as Fig. 14, and Fig. 17 represents a portion of the same in cross-section, the front roller in both figures being represented in its first position, and the back roller in position over the packets, and the long ends of the labels pasted on the packets. Fig. 18 represents the labeling-table with the rising and falling divisional platform in its raised position and the finished packets ready to be removed by the folding-board. (Represented in plan in Fig. 19 and elevation in Fig. 20.) Fig. 21 is a side elevation showing one of the drivers in contact with one of the rolls, the carriage being shown in dotted lines.

The same letters of reference indicate the same parts in the several figures of the drawings.

$bb$ are the inclined channels, arranged side by side at the back of the machine, in which channels the packets $a$ of powdered material to be labeled are placed to be conveyed to the divisional packet-receiver $g$, jointed to the bottom of the said channels $b$.

To the standards, which support the upper outward ends of the channels $b$, are secured lugs $k$, and to these lugs are pivoted the side bars, $a'$, having at their lower ends upwardly-extending shoulders $a^2$, which carry the cross check-bar $b^2$, which limits the movement of the packets in the channels, as will hereinafter be described. To the inner supporting-standards of the channels are secured lugs $k'$, which form guides for the bars $a'$ in their rocking movement on their pivots in lugs $k'$. These arms $a'$ are extended forwardly, so as to lie over a small roller on the receiver $g$, and are raised and lowered as the receiver $g$ is raised and lowered, as will hereinafter be described.

$g^3$ is a cross check-bar, mounted on the divisional packet-receiver $g$, and moves with said receiver. By means of the said check-bars $b^2$ and $g^3$ the packets $a$ are permitted to descend, and their motion is arrested at the proper times, as hereinafter described. $c$ is the rising and falling frame, supporting the divisional label-tray $c^2$, and over the said tray $c^2$ is the series of taking-off blocks or pasters $e\,e$, the said pasters being equal in number to the divisions in the label-tray $c^2$. The rising and falling frame $c$ works in the vertical slides $c^3$ $c^3$, and is raised for the purpose of pressing the labels contained in the tray $c^2$ into contact with the pasting-blocks $e\,e$, brought over them by means of the treadle-lever $c^6$ turning on the center $c^7$, and pressed upon by the treadle-bar $c^8$. The inner end of the lever $c^6$ is connected to the rising and falling frame $c$ by the connecting-rod $c^5$. (See Figs. 1 and 2.) The pasters $e\,e$ are supported upon a traveling carriage, working upon the basements or rails $jj$. (Best seen in Fig. 4.) By means of the said carriage and rails the pasters $e\,e$ can either be moved to the back of the machine, as represented in Fig. 7, or drawn forward into the position represented in Figs. 1, 2, 3, 4, and 5. By the back movement of the pasters $e\,e$ they receive paste from the paste-feeding rollers $f^2$ $f^2$, situated in the paste-trough $f$, under the channels $b\,b$, and by the forward or return movement the pasters charged with paste are brought over the divisional tray $c^2$ containing the labels. The backward motion of the pasters is limited by the stops $j^3 j^3$, and the forward motion by the studs $e^{10}$ (see Fig. 3) coming against the stop $j^4$. The feeding-rollers $f^2 f^2$ in the paste-trough $f$ are equal in number to the pasters $e\,e$, the said paste-feeding rollers $f^2 f^2$ being rotated as the pasters pass over them by the drivers $f^5 f^5$ (see Fig. 4) bearing on the roughened rollers $f^4 f^4$ (see Fig. 3) on the spindle of the feeding-rollers.

The drivers $f^5$ are longitudinal bars secured to the frame of the pasters and bearing against the rollers $f^4$, so as to move them by frictional contact. The movement of the pasters $e\,e$ for bringing them over and for removing them from over the paste-trough $f$ is effected by the levers $e^4 e^4$ on the rocking shaft $e^9$, the said levers $e^4 e^4$ being connected by the links $e^3 e^3$ to the traveling arms $e^2 e^2$ of the pasters $e\,e$. The levers $e^4 e^4$ are operated upon by the handle $e^6$, connected by the links $e^5 e^5$ and a cross-shaft, $x$, to the levers $e^4 e^4$. (See Figs. 1, 2, and 3.) The sliding pasters $e\,e$ carry the swiveling or jointed press-bar $h$, by means of which the packets are pressed down upon the pasted labels, and the said labels and packets carried down upon the divisional platform $d^{10}$ of the label-table $d$, for pressing and pasting the labels against the bottoms and back and front ends of the packets $a$, as hereinafter particularly explained. The press-bar $h$ is carried by the levers $h^2 h^2$, and is brought into its lowered position by grasping the said press-bar $h$, and when the press-bar is loosed it is raised out of action by the coiled springs $h^3 h^3$. It is by the traveling of the pasters $e\,e$ toward the paste-trough $f$ that the series of packets $a$ is permitted to pass from the divisional packet-receiver $g$ to the labeling-table $d$, and by the traveling of the pasters in the opposite direction that the lowest set of packets $a$ is permitted to pass from the sluices $b\,b$ into the divisional packet-receiver $g$, to be released therefrom on the next back motion of the pasters. The way in which this is effected will be best understood by referring to Figs. 5, 6, and 7. Attached to the tops of the pasters $e\,e$ are guides $e^8 e^8$, and on the under side of the jointed packet-receiver $g$ are rollers for the guides $e^8$ to work against. When the pasters $e\,e$ are over the label-tray $c^2$, as represented in Figs. 5 and 6, the packet-receiver $g$ is lifted by the said guides $e^8$ nearly into a horizontal position. By this lifting of the packet-receiver $g$ the set of packets $a$, which had been held by the check-bar $b^2$ in the channels $b$, is taken out of action, and the said packets are permitted to pass into the packet-receiver $g$, where they are held at the top of the said receiver by the check-bar $g^3$, against which they are made to bear. As the pasters $e\,e$ are moved from the label-tray $c^2$ over the paste-trough $f$, as represented in Fig. 7, the withdrawal of the guides $e^8$ from under the packet-receiver $g$ permits the latter to fall into the same line as the inclined channels $b$, thereby releasing the packets from under the check-bar $g^3$, which packets slide down the receiver $g$ and are arrested at the bottom by the leveling-bar $d^5$. Hereinafter described. The same motion of the pasters $e\,e$ allows the arms $a'$ to fall down, and thus brings the check-bar $b^2$ into action and arrests the motion of the packets in the channels $b$, as seen in Fig. 7.

The construction of the labeling-table $d$ will be best understood by referring to the enlarged views, Figs. 9 to 18, both inclusive. The said table $d$ is situated at a lower level than the pasters $e\ e$, so that it can be moved under the said pasters. (See Figs. 6 and 7.) The labeling-table is supported on a carriage, which works on rails below the rails $j\ j$, on which the carriage of the pasters works. The forward motion of the labeling-table $d$ to bring it into action under the pasters $e\ e$ is limited by the stop $j^2$, the movement of the said table being effected by grasping the spindle $d^{14}$. In the labeling-table is the rising and falling divisional platform $d^{10}$, on which the pasted labels are laid, and onto which labels the packets from the packet-receiver $g$ fall, as hereinafter explained. The rising and falling platform $d^{10}$ of the labeling-table $d$ works in a well or recess in the said table, the said platform $d^{10}$ being raised and maintained in its raised position, Figs. 5, 6, 7, 8, and 18, by the cam-like levers $d^9\ d^9$ on the spindles $d^6\ d^6$, the said spindles being connected together by the arms and connecting-rod $d^8\ d^8$, indicated in dotted lines in Fig. 18. One of the spindles $d^6$ is furnished with a handle, $d^7$, for operating the cam-levers $d^9\ d^9$. By taking the cam-levers $d^9\ d^9$ out of action, by moving the handle $d^7$ in the required direction, the platform $d^{10}$ takes its lowered position, as best seen in Figs. 10 and 13, the said platform being received upon the india-rubber pads $d^{18}\ d^{18}$. The labeling-table also carries the front and back rollers, $d^{11}$ and $d^{16}$, situated on a level with the top of the said table $d$, the said rollers $d^{11}$ and $d^{16}$ being for the purpose of pasting down the short and long ends of the labels upon the packets. The front roller, $d^{11}$, is carried in bearing-plates on the table $d$, which plates are drawn home into the position represented in Fig. 16 by the coiled springs $d^{12}$. The said bearing-plates are pressed toward the back roller, $d^{16}$, by means of heels $d^{20}$ on the spindle $d^{21}$ of the lever-grip acting on the outer ends of the said bearing-plates.

The manner in which the heels $d^{20}$ act against the bearing-plates carrying the front roller, $d^{11}$, is best seen in Fig. 12. By depressing the handle $d^3$ of the lever-grip $d^2$ the heels $d^{20}$ push forward the bearing-plates and front roller, $d^{11}$, the said plates when at liberty to move being returned to their normal position by the action of the coiled springs $d^{12}$. The back roller, $d^{16}$, is made capable of being moved to and from the front roller, $d^{11}$, by means of the connecting rods and levers $d^{15}$, the said levers being fixed on the spindle $d^{14}$, worked by the handle $d^{13}$. By depressing the handle $d^{13}$ the back roller, $d^{16}$, can be brought to the position represented in Fig. 16, and by raising the said handle $d^{13}$ the roller $d^{16}$ is returned to its normal position, as seen in Figs. 9, 10, and 14. Along the labeling-table $d$ is a lever-grip, $d^2$, fixed to the spindle $d^{21}$, turning in bearings in the framing of the machine. (See Figs. 11 and 13.) This lever-grip $d^2$ is for the purpose of holding the unpasted ends of the labels for removing the pasted labels from the pasters, and securing them in the proper position on the labeling-table $d$. The said lever-grip is moved into and out of action by means of the handle $d^3$, the friction-spring at $d^4$, bearing on the spindle $d^{21}$, maintaining the said lever-grip in its acting and non-acting positions, respectively. When the lever-grip $d^2$ is put into action, it grips the labels between its edge and the india-rubber bed $d^{19}$ on the labeling-table $d$. $d^5$ is the leveling-bar carried by the labeling-table, the said leveling-bar being for the purpose of preventing the descent, except at the proper times, of the packets in the packet-receiver $g$, and also for leveling the packets after they have fallen onto the labeling-table. The said leveling-bar $d^5$ is connected by end arms, $d^{22}$, (see Fig. 13,) to the distance-rod $d^{23}$, and the said arms $d^{22}$ turn as a center on the spindle $d^{21}$.

The leveling-bar $d^5$ is operated by hand, and is provided with a hand button or knob, $d^{26}$, for that purpose. Its normal position is that shown in Fig. 10, the distance-rod $d^{23}$ striking against a projection, as shown in said figure, and thus preventing it from moving farther backward in one direction than is shown in said figure. When the said leveling-bar $d^5$ is brought into the position represented in Fig. 7, it prevents the descent of the packets from the receiver $g$. The said leveling-bar $d^5$ carries an angle-tooth along its whole length, and the front end of the traveling carriage, on which the pasters $e\ e$ are supported, has a hooked catch, $e^7$, by means of which tooth and catch the leveling-bar $d^5$ is automatically operated for releasing the packets from the packet-receiver $g$.

We will now describe the action of the machine. The parts being in the positions represented in Figs. 1, 2, and 3, and the taking-off blocks or pasters $e\ e$ having been supplied with paste, the first operation is to raise the label-tray $c^2$, supported on the rising and falling frame $c$, by pressing the foot upon the treadle-bar $c^8$ of the treadle-lever $c^6$. The top labels in the label-tray $c^2$ are thereby pressed into contact with the charged pasters $e\ e$ above them, as represented in Figure 5. The frame $c$ is then allowed to descend by removing the foot from the treadle-bar $c^8$ thus leaving a label attached to each of the pasters $e\ e$. The labeling-table $d$ is next pushed forward—that is, toward the back of the machine and underneath the pasters $e\ e$—by means of the spindle $d^{14}$, the stops $j^2$ determining the position of the said table, as represented in Fig. 6. The lever-grip $d^2$ is next put into action by means of the handle $d^3$, and the short unpasted ends of the labels on the pasters are thereby gripped, as represented in Figs. 6 and 7. As the labeling-table is pushed forward it causes the tooth of the leveling-bar $d^5$ to be engaged with the catch $e^7$ on the pasters $e\ e$, as seen in Fig. 6. The pasters $e\ e$ are now moved to their back position over the paste-trough $f$ and against the stops $j^3\ j^3$, as represented in Fig. 7, by means of the handle $e^6$, operating the lever mechanism $e^3$ $e^4$ $e^5$, as before explained. As the pasters take their back position, the catch $e^7$, which is engaged with the leveling-bar $d^5$, causes the latter to fall into position across the bottom of the packet-receiver $g$, and the pasted labels are left upon the labeling-table $d$, being secured to the said table by the lever-grip $d^2$. The back movement described of the pasters $e$ $e$ also removes the guides $e^8$ from under the jointed packet-receiver $g$, which falls into the position represented in Fig. 7, so as to bring its divisions into a line with the divisions of the inclined channels $b$ $b$. The packets in the receiver being released from the check-bar $g^3$, they slide against the leveling-bar $d^5$, which has been brought, in the manner before described, to the bottom of the receiver $g$, as represented in Fig. 7, thus preventing the packets passing onto the labeling-table $d$. As the receiver $g$ falls down, as just described, the arms $a'$ will also fall, carrying with them the cross-bar $b^2$, which is thus caused to bind upon the packets in the channels $b$ $b$, and prevent another set of packets from entering the receiver $g$ until the arms $a^2$ are raised by the return movement of the pasters. The pasters $e$ $e$, together with the labeling-table $d$, are next drawn back to their first positions at the front of the machine by means of the spindle $d^{14}$ of the labeling-table—that is, into the positions represented in Figs. 1 and 2—the labeling-table bringing the pasters forward with it. As the pasters make their forward motion to the front of the machine they receive paste from the paste-rollers $f^2$, the brush $f^3$ taking from the said pasters any surplus paste and spreading the paste uniformly upon the pasters. By means of the stop $j^4$, against which the stud $e^{10}$ on the pasters $e$ $e$ bears, the proper position of the pasters over the label-tray $c^2$ is determined. As the labeling-table is withdrawn, together with the pasters, the tilting of the divisional packet-receiver $g$ by the action of the guides $e^8$ upon it causes the packets to fall therefrom upon the labeling-table $d$, in the position indicated in dotted lines in Fig. 9. After the withdrawal of the labeling-table from the pasters, the leveling-bar $d^5$ is first raised to release the packets, and afterward pressed down against the ends of the packets, so as to place them in the position represented in full lines in the said Fig. 9—that is, exactly on the divisional platform $d^{10}$ of the labeling-table. The lever-grip $d^2$ is now thrown out of action, so as to release the labels. The several packets are thus placed upon the pasted labels, and the pressing of the said pasted labels upon the packets has now to be performed. The first motion is to permit of the descent of the platform $d^{10}$. This is effected by taking out of action the cam-levers $d^9$ by moving the handle $d^7$. (See Fig. 13.) The press-bar $h$ is simultaneously brought down upon the packets, thereby forcing the platform $d^{10}$ into its lowest position upon the india-rubber pads $d^{18}$ $d^{18}$, carrying with it the packets $a$, together with the labels, thus pasting the labels against the bottom and back and front ends of the packets, as seen in Figs. 10, 11, and 13. The press-bar $h$ being allowed to return to its normal or raised position, the spindle $d^{21}$ of the lever-grip $d^2$ is partly rotated by means of the handle $d^3$, so as to advance the front roller, $d^{11}$, over the tops of the packets, as represented in Figs. 14 and 15, thus pasting the short ends of the labels upon the tops of the packets. The roller $d^{11}$ being returned to its original position by the action of the springs $d^{12}$, the handle $d^{13}$ is next depressed, so as to make the roller $d^{16}$ approach the roller $d^{11}$, and thereby press upon and paste down the long ends of the labels upon the packets, as illustrated in Figs. 16 and 17. The back roller, $d^{16}$, is next returned to its original position, and the platform $d^{10}$ is raised to the level of the labeling-table, and supported in that position by the cam-levers. The labeled packets are now finished, and are ready for removal. This is effected by means of the hinged folding-board $i$. (Represented in Figs. 19 and 20.) This board being made to inclose nearly three sides of the packets, they can be readily removed from the divisions of the platform $d^{10}$. The labeled packets, being removed from the board $i$, are ready to be packed for sale.

We use the machine described and illustrated for labeling boxes in the way described and represented with respect to packets of powdered material or other commodities.

Having now particularly described and ascertained the nature of our said invention, and in what manner the same is to be performed, we declare that what we claim is—

1. The combination of the traveling pasters $e$ $e$ with the fixed paste-trough $f$, paste-feeding rollers $f^2$, and paste-distributing brush $f^3$, for the purpose and substantially as hereinbefore described.

2. The combination, in a machine for labeling packets and boxes of powdered materials and other commodities, of the pasters $e$ and the traveling labeling-table $d$, carrying the following parts, namely: the rising and falling divisional platform $d^{10}$, on which the pasted labels and packets or boxes are deposited, the lever-grip $d^2$, and the leveling-bar $d^5$, the said traveling labeling-table being capable of being carried under the pasters $e$ $e$ and removed from under the said pasters, the several parts being for the purposes and acting substantially as hereinbefore described.

3. The combination, with the labeling-table $d$, formed with a well, carrying a movable platform, $d^{10}$, of the sliding rollers $d^{11}$ and $d^{16}$, located on opposite sides of the well, and levers for moving the rollers, substantially as described.

4. The combination, in a machine for labeling packets and boxes, of the label-tray lifter $c$, the divisional label-tray $c^2$, the pasters $e$ $e$, the traveling labeling-table $d$, and the presser-bar $h$, all being constructed and acting substantially as hereinbefore described.

5. The combination, in a machine for labeling packets and boxes, of the receiver $g$, jointed to the bottoms of the inclined channels $b\ b$ and carrying the check-bar $g^3$, the leveling-bar $d^5$, and the pivoted arms $a'$, carrying the check-bar $b^2$, all constructed and operating substantially as described.

6. The combination, with the inclined channels $b$ and the receiver $g$, hinged or jointed thereto, of the traveling pasters $e$, located thereunder and provided with the guides $e^8$ for operating the receiver $g$ as the paster passes to and fro under the same, substantially as described.

7. The combination of the inclined channels $b$ and receivers $g$, hinged or jointed thereto, the traveling pasters, provided with a catch, $e^7$, and guides $e^8$, and the traveling table provided with the angle-toothed leveling-bar $d^5$, substantially as and for the purposes described.

JOHN TICKLE. [L. S.]
FREDERICK LEONARDT. [L. S.]

Witnesses:
GEORGE SHAW,
RICHARD SKERRETT.

It is hereby certified that the name of one of the assignees in Letters Patent No. 346,832, granted August 3, 1886, upon the application of John Tickle, of West Bromwich, and Frederick Leonardt, of Handsworth, County of Stafford, England, for an improvement in "A Machine for Labeling Packets," was erroneously written in the grant "Edward Carrick," whereas said name should have been written *Edward Caddick;* and that the said Letters Patent should be read with this correction therein that the same may conform to the record of the case in the Patent Office.

Signed, countersigned, and sealed this 5th day of October, A. D. 1886.

[SEAL.]
H. L. MULDROW,
*Acting Secretary of the Interior.*

Countersigned:
R. B. VANCE,
*Acting Commissioner of Patents.*